Patented Mar. 3, 1936

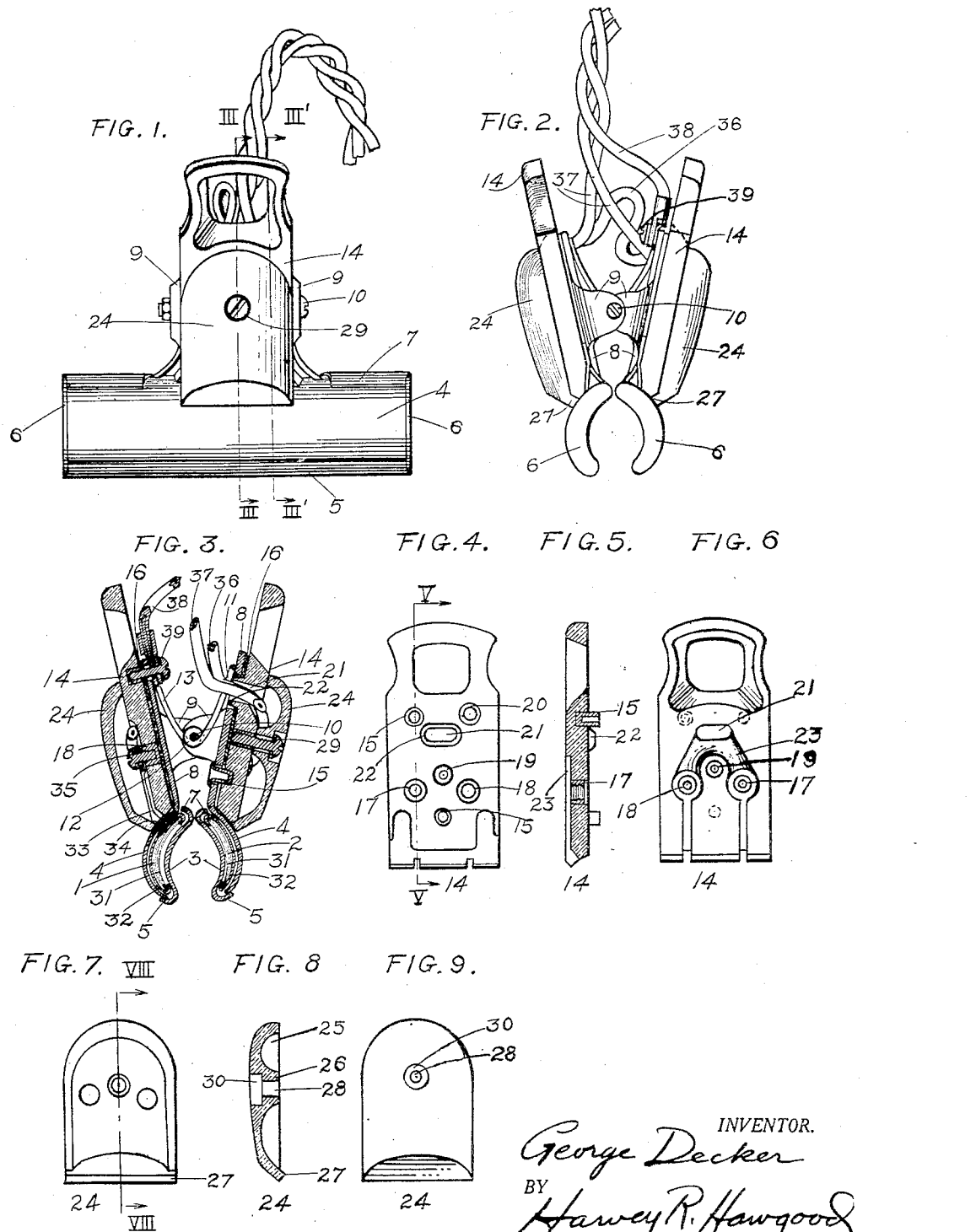

2,032,474

UNITED STATES PATENT OFFICE 2,032,474

HEATER AND HANDLE THEREFOR

George Decker, Cleveland, Ohio

Application March 18, 1929, Serial No. 347,779

6 Claims. (Cl. 219—24)

This invention relates to electrical apparatus and more particularly to electrical heaters and handles therefor.

An object of the invention is to provide an improved handle which will effectively house and protect electrical connections.

Another object is to provide an improved handle which may be readily and economically manufactured and assembled with its associated parts.

Another object is to provide an improved handle housing electrical connections in a manner to permit easy access thereto.

Other objects will hereinafter appear.

The invention will be better understood from the description of one practical embodiment thereof, illustrated in the accompanying drawing, in which;

Figure 1 is a side elevation of a "permanent waving" heater having handles embodying the invention;

Figure 2 is an end elevation of the heater of Figure 1;

Figure 3 is a cross sectional view of the apparatus of the first two figures, the right hand half of this figure being taken on line III—III of Figure 1 and the left hand half being taken on line III'—III' of this figure;

Figure 4 is a rear elevation of the handle or grip member;

Figure 5 is a cross sectional view thereof taken on line V—V of Figure 4;

Figure 6 is a front elevation of the handle;

Figure 7 is a rear elevation of a handle cover;

Figure 8 is a cross sectional view thereof taken on line VIII—VIII of Figure 7; and Figure 9 is a front elevation of the cover.

The heater shown is of the type having two electrical heating elements 1 and 2, each of which is enclosed in an arcuate or curved casing or housing, the casings being conveniently formed of sheet metal.

Each casing is composed of an inner plate 3 and an outer plate 4. The inner plate is of arcuate shape in cross section and is formed with marginal flanges 5, 6 and 7, the latter of which is cut away near its center to clear the electrical connectors. These flanges are bent about the edges of the arcuate portion of the outer plate 4 to secure the parts of the casing together and so enclose the heating element. The outer plate has, centrally disposed of its upper edge, an arm 8 integral with it, on the sides of which are two lugs 9 for the reception of a pivot bolt 10 which holds the halves of the heater together.

A spring consisting of a loop 11 bearing upon one arm 8, coiled portions 12 surrounding the pivot bolt, and ends 13 bearing upon the other arm, presses the upper ends of the arms apart and so resiliently holds the casings together.

Rigidly secured to each arm is a handle or grip member 14. This member consists of a substantially flat piece of a material which is an efficient insulator of both heat and electricity. I prefer to use a readily molded material for this purpose, for instance a phenolic condensation product such as bakelite, although other materials such as fibre, hard rubber, porcelain or the like might be used. The handle is secured to the arm by hollow rivets 15 which have ends embedded in the member and hollow portions extending through apertures in the arm, these portions being riveted or rolled over as shown to secure these parts together. A layer of asbestos 16 or other heat insulating material is interposed between the arm and handle to further insulate the latter from the heating element.

Embedded in the handle are internally threaded bushings 17, 18, 19, and 20, the first three opening to the front face of the handle and the last opening to the rear face thereof. The member is apertured at 21 and the aperture surrounded by a rearwardly extending flange 22 which extends through a corresponding aperture in the arm 8. A recess 23 is formed in the front of the handle and extends from the aperture around bushings 17 and 18 and thence to the bottom of the handle, the recess being to receive conductors between the heating element and a source of electricity.

A cover 24 is provided to cover the lower part of the handle and enclose the conductors and terminals carried thereby. This consists of a substantially flat piece of heat and electricity insulating material, preferably the same as used for the handle, and is hollowed out at 25 on its inner side so that it contacts the handle only at its edges and at its center where a boss 26 is formed. A flange or lip 27 along the lower edge of the cover contacts the lower edge of the handle and maintains these two parts in proper alinement. The boss has a hole 28 extending therethrough in alinement with bushing 19, a screw 29 passing through the hole and being threaded into the bushing to hold the cover to the handle. The outer end of hole 28 is enlarged at 30 after the manner of a counterbore so that the head of the screw may be received therein and so prevented from contacting the hand of the operator.

The heating elements each comprise a coil of resistance wire 31 insulated by sheets of mica or the like, and held in shape by a clamping strip 32. Two lead-in wires 33 extend from each element, these passing through insulating washers 34 placed in openings through the casing and then pass along recess 23 to bushings 17 and 18. At these points the lead-in wires are connected by screws 35 to conductors 36 and 37 which, respectively, connect the pair of elements in series and to a source of current (not shown) such as an ordinary lighting circuit, these conductors passing from recess 23 through aperture 21 to the space between the handles.

A conductor 38 is connected by a screw 39 threaded into bushing 20 to one of the arms 8 and is grounded so that the metal of both shells is prevented from transmitting electricity to the head of the subject being operated upon.

The rivets and bushings are most conveniently embedded in the handle by being placed in the mold in which the handle is formed and having the handle molded about them. However, with some materials it might be desirable to insert these parts after forming the handle and secured by other means than the molded material itself.

From the above it will be seen that I have provided an apparatus which is simple in construction, in which the electrical connections are effectively protected while being readily accessible by removing the cover, which is neat and attractive in appearance, and which protects both the operator and subject from heat and electricity.

While I have described the illustrated embodiment with considerable particularity, this is done by way of illustration only and, it being obvious that many other embodiments will readily occur to those skilled in this art, I do not limit myself to the illustrated and described details but claim as my invention all embodiments coming within the scope of the appended claims.

I claim:

1. A permanent waving heater, comprising two curved hollow metal sections, electrical heating elements within said sections, an integral insulating handle rigidly attached to one section, a similar insulating handle attached to the other section, the handles being recessed, lead-in wires from the heating elements extending into said recesses, conductors extending into said recesses, terminals connecting said lead-in wires to said conductors, and covers overlying said recesses, and pivotal means connecting the sections together.

2. A permanent waving heater, comprising hollow metallic sections provided with extensions pivotally connected together, electrical heating elements within said sections, handles of insulating material secured to said extensions, a recess in each handle, electrical terminals within the recesses, lead-in wires extending into said recesses from said electrical elements, conductors extending into said recesses and connected by said terminals to said lead-in wires.

3. A permanent waving heater, comprising hollow metallic sections provided with extensions pivotally connected together, electrical heating elements within said sections, flat handles of insulating material secured to said extensions, an outwardly facing recess in each handle, electrical terminals within the recesses, lead-in wires extending into said recesses from said electrical elements, conductors extending into said recesses and connected by said terminals to said lead-in wires, and insulating covers overlying said recesses and enclosing said lead-in wires, terminals and conductors.

4. A permanent waving heater, comprising two hollow metal shells pivotally connected together and each having a flat extension, an electrical heating element enclosed within each shell, a relatively broad handle of insulating material attached to each extension with one of its broad surfaces adjacent the extension, a recess in the other broad surface of said handle, lead-in wires extending into said recess, insulated conductors extending into said recess, terminals within said recess joining said lead-in wires and conductors, and an insulating cover overlying said recess and secured against said second mentioned broad surface of the handle.

5. A heater comprising an electric heating element, a casing enclosing the element having an extending arm, a handle of molded insulating material, threaded bushings embedded in the handle, hollow rivets embedded in the handle and extending through openings in the arm and rolled over to secure the handle to the arm, screws threaded into the bushings, a pair of lead-in wires from the heating elements to two of the screws, conductors connected to said two screws, and an insulating cover enclosing said lead-in wires and bushings and secured by a third screw threaded into a third bushing in said handle.

6. A heater comprising two electric heating elements, two casings enclosing said elements, an arm extending from each casing, a pivot connecting said arms, lead-in wires from each element passing through apertures in its casing adjacent its arm, an insulating handle carried by each arm, electric terminals carried by the side of each handle away from its arm and connecting said lead-in wires to electric conductors, and an insulating cover carried by each handle enclosing said lead-in wires and terminals.

GEORGE DECKER.